US009241146B2

(12) United States Patent
Neill

(10) Patent No.: US 9,241,146 B2
(45) Date of Patent: Jan. 19, 2016

(54) INTERLEAVED APPROACH TO DEPTH-IMAGE-BASED RENDERING OF STEREOSCOPIC IMAGES

(71) Applicant: NVIDIA Corporation, Santa Clara, CA (US)

(72) Inventor: Patrick Neill, Portland, OR (US)

(73) Assignee: NVIDIA Corporation, Santa Clara, CA (US)

(*) Notice: Subject to any disclaimer, the term of this patent is extended or adjusted under 35 U.S.C. 154(b) by 175 days.

(21) Appl. No.: 13/668,055

(22) Filed: Nov. 2, 2012

(65) Prior Publication Data
US 2014/0125650 A1 May 8, 2014

(51) Int. Cl.
*H04N 13/00* (2006.01)

(52) U.S. Cl.
CPC ...... *H04N 13/0011* (2013.01); *H04N 2213/003* (2013.01)

(58) Field of Classification Search
CPC .......... H04N 13/0059; H04N 13/0055; H04N 13/026; H04N 13/0048; H04N 13/021; H04N 13/0029; H04N 13/0207; H04N 2213/003; H04N 13/0007; G06T 2207/10012; G06T 2207/10021; G06T 2207/10028
USPC .................. 348/42, 43, 51, E13.071, E13.02, 348/E13.068, E13.07, E13.003; 345/419, 345/422; 352/58, 60, 62, 86
See application file for complete search history.

(56) References Cited

U.S. PATENT DOCUMENTS

| 6,429,876 B1* | 8/2002 | Morein .................. 345/611 |
| 2007/0183650 A1* | 8/2007 | Lipton et al. ................ 382/154 |
| 2011/0261050 A1* | 10/2011 | Smolic et al. .............. 345/419 |
| 2012/0176368 A1* | 7/2012 | Genova .................. 345/419 |
| 2013/0147911 A1* | 6/2013 | Karsch et al. ............... 348/43 |
| 2013/0293565 A1* | 11/2013 | Arvo ..................... 345/589 |

OTHER PUBLICATIONS

Lee et al., View Extrapolation Method using Depth Map for 3D Video Systems; APSIPA ASC 2011: APSIPA Annual Summit and Conference 2011; Oct. 2011.*

* cited by examiner

*Primary Examiner* — Carlos Perromat
(74) *Attorney, Agent, or Firm* — Artegis Law Group, LLP

(57) ABSTRACT

Techniques are disclosed for generating stereoscopic images. The techniques include receiving a first image frame associated with a first eye, and receiving a first depth frame associated with the first eye. The techniques further include reprojecting the first image frame based on the first depth frame to create a second image frame associated with a second eye. The techniques further include identifying a first pixel in the second image frame that remains unwritten as a result of reprojecting the first image frame, and determining a value for the first pixel based on a corresponding pixel in a prior image frame associated with the second eye. One advantage of the disclosed techniques is that DIBR reprojected image frames have a more realistic appearance where gaps are filled using pixels from a prior image for the same eye.

22 Claims, 4 Drawing Sheets

LEFT EYE IMAGE FRAME
310

LEFT EYE DEPTH FRAME
320

RIGHT EYE IMAGE FRAME
WITH DISOCCLUSION
330

RIGHT EYE IMAGE FRAME
AFTER FILLING GAPS
340

INTERLEAVED APPROACH TO DEPTH-IMAGE-BASED RENDERING OF STEREOSCOPIC IMAGES

BACKGROUND OF THE INVENTION

1. Field of the Invention

The present invention generally relates to stereoscopic image processing, and, more particularly, to an interleaved approach to depth-image-based rendering of stereoscopic images.

2. Description of the Related Art

Stereoscopic imagery is created by generating separate image frames for the left eye and the right eye, creating a three-dimensional viewing experience. In order to reduce the rendering and transmission time needed to generate two separate image streams, stereoscopic imagery may be accomplished by rendering images and depth information for one eye. Images for the second eye are then generated using a post-rendering process called depth-image-based rendering (DIBR). With DIBR, images are rendered for only one eye, thus reducing rendering time as compared rendering images for both eyes. Additionally, depth information consumes less space and compresses more efficiently than image information. Therefore, transmission of images plus depth information for a single eye consumes less bandwidth than transmission of images for two eyes.

With DIBR, image picture elements (pixels) for one eye undergo a reprojection step utilizing the depth frame to create image pixels for the second eye. Because each eye sees a slightly different view of a scene, some of the pixels in the image generated for the second eye may not map to a corresponding pixel in the image for the first eye. When this occurs, holes or gaps appear in the image generated for the second eye. This phenomenon is called disocclusion. Various approaches are used to remedy disocclusion, including techniques to minimize creation of holes and techniques to fill such gaps with plausible color information.

Creation of gaps may be minimized by smoothing the data in the depth frame. Depth frame smoothing reduces high frequency noise, which is the primary cause of holes in the generated image. Depth frame smoothing may also blend surrounding silhouette colors into gaps. As a result, the gaps are less noticeable, but the generated image may appear blurry or objects in the image that are near the gaps may appear to be unnaturally stretched. Alternatively, gaps may be filled using various approaches such as inward painting (in-painting) the gaps using neighboring pixels, using averaging filters, or filling the holes with constant colors. One drawback with these approaches is that the gaps are filled with image data that is not actually seen by the second eye, resulting in a less realistic appearance. Artifacts of these approaches may be more noticeable where gaps are relatively large and where objects are close to the eyes.

As the foregoing illustrates, what is needed in the art is an improved technique for generating stereoscopic images using DIBR.

SUMMARY OF THE INVENTION

One embodiment of the present invention sets forth a method for generating stereoscopic images. The method includes receiving a first image frame associated with a first eye, and receiving a first depth frame associated with the first eye. The method further includes reprojecting the first image frame based on the first depth frame to create a second image frame associated with a second eye. The method further includes identifying a first pixel in the second image frame that remains unwritten as a result of reprojecting the first image frame, and determining a value for the first pixel based on a corresponding pixel in a prior image frame associated with the second eye.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a system configured to implement one or more aspects of the disclosed methods.

One advantage of the disclosed techniques is that DIBR reprojected image frames have a more realistic appearance where gaps are filled using pixels from a prior image for the same eye.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
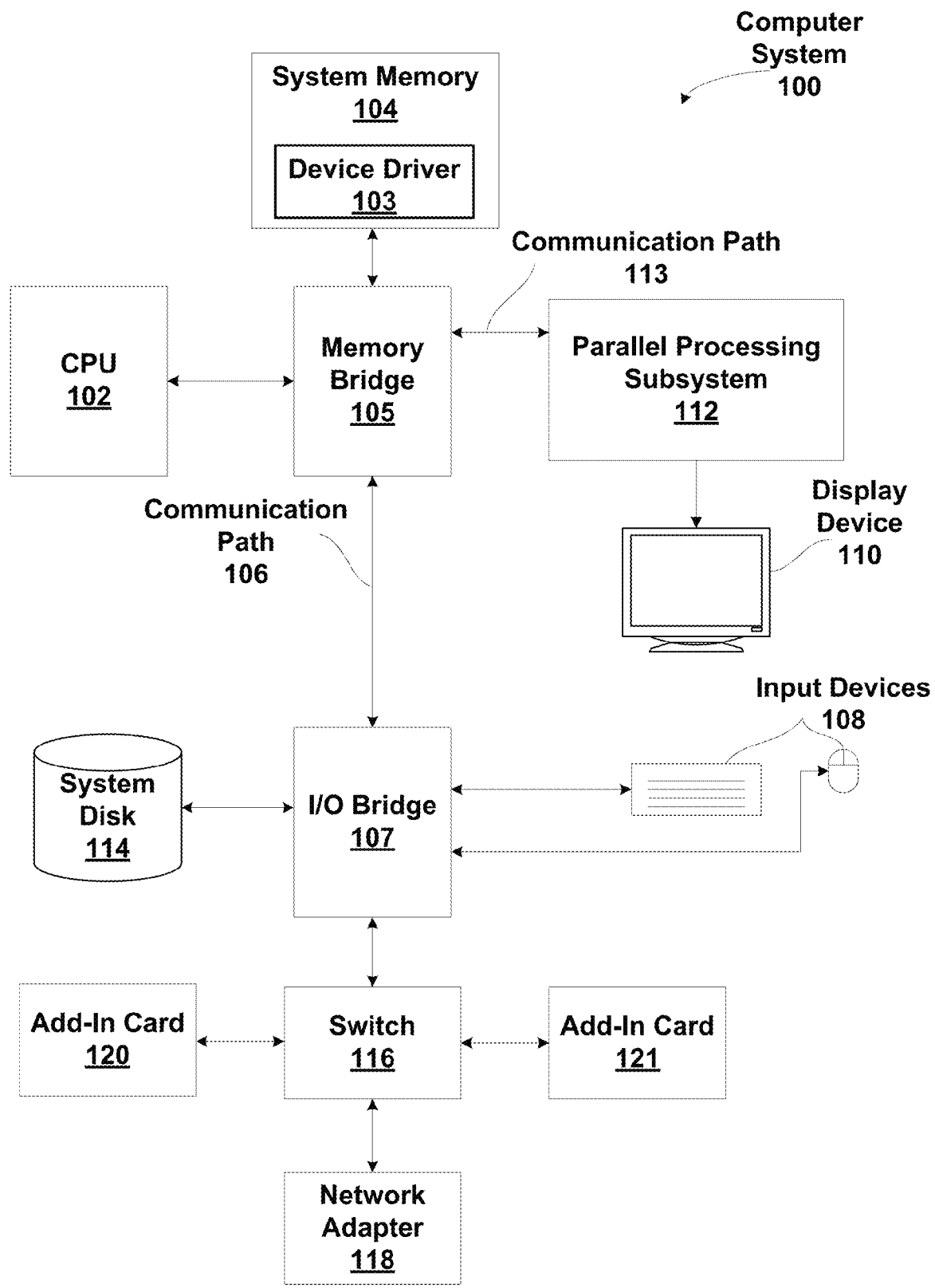
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI)

Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

In one embodiment, the parallel processing subsystem 112 includes one or more parallel processing units (PPUs), each of which is coupled to a local parallel processing (PP) memory. In general, a parallel processing subsystem includes a number of PPUs, PPUs and parallel processing memories may be implemented using one or more integrated circuit devices, such as programmable processors, application specific integrated circuits (ASICs), or memory devices, or in any other technically feasible fashion. In some embodiments, some or all of the PPUs in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory (which can be used as graphics memory including, e.g., a conventional frame buffer) to store and update pixel data, delivering pixel data to display device 110, and the like. In some embodiments, parallel processing subsystem 112 may include one or more PPUs that operate as graphics processors and one or more other PPUs that are used for general-purpose computations. The PPUs may be identical or different, and each PPU may have a dedicated parallel processing memory device(s) or no dedicated parallel processing memory device(s). One or more PPUs in parallel processing subsystem 112 may output data to display device 110 or each PPU in parallel processing subsystem 112 may output data to one or more display devices 110.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more graphics processing units (GPUs). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Interleaved Depth-Image-Buffer Rendering

In some embodiments, the parallel processing subsystem 112 is configured to receive stereoscopic images for display on the display device 110, where each frame of a stereoscopic image includes an image frame to be viewed by the left eye and an image frame to be viewed by the right eye. The left eye and right eye image frames correspond to the left and right eye perspectives as viewed by human eyes. The display device 110 is configured to receive left eye image frames on a left channel and right eye image frames on a right channel. As further described below, an image frame for one eye may be reconstructed from an image frame and a depth frame generated for the other eye. The display device 110 receives the left eye and right eye image frames, and displays the image frames such that each of the viewer's eyes sees only the images generated for the particular eye, thereby creating a stereoscopic effect.

Figure 2:
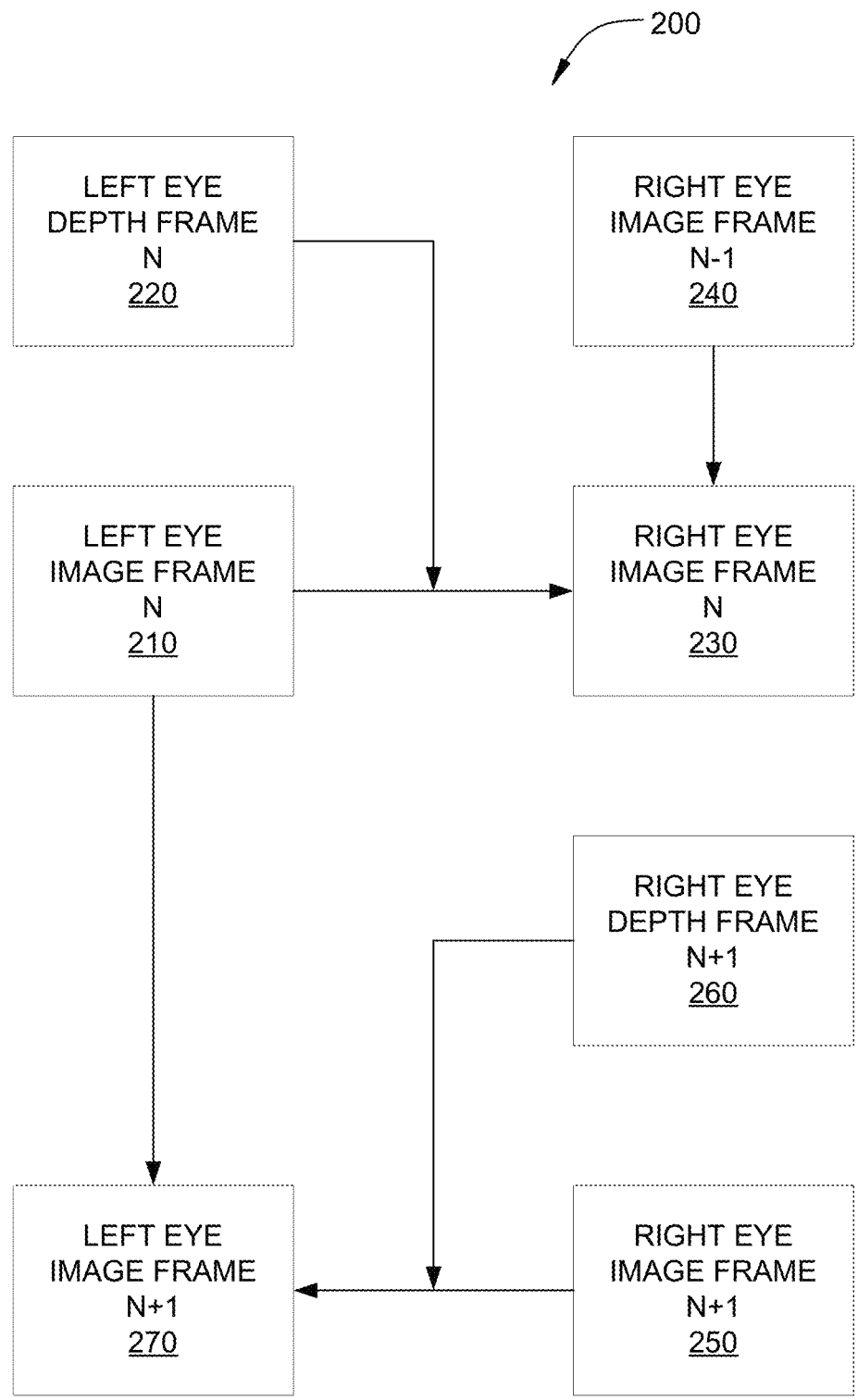
FIG. 2 illustrates image frame and depth frames associated with depth-image-based rendering, according to one embodiment of the present invention.

FIG. 2 illustrates image frame and depth frames associated with depth-image-based rendering, according to one embodiment of the present invention. As shown, the illustration includes a right eye image frame at time N−1, image and depth frames at time N, and image and depth frames at time N+1.

The left eye image frame N 210 is an array of pixels representing an image at time N to be viewed by the left eye. The parallel processing subsystem 112 receives the left eye image frame N 210 and transmits the left eye image frame N 210 to the left channel of the display device 110. The parallel processing subsystem 112 may also store the left eye image frame N 210 in a memory buffer.

The left eye depth frame N 220 is an array of depth values at time N corresponding to the pixels of the left eye image frame N 210. Each depth value in the left eye depth frame N 220 represents the distance of the corresponding pixel in the left eye image frame N 210 from the screen surface of the display device 110.

The right eye image frame N 230 is an array of pixels representing an image at time N to be viewed by the right eye. The parallel processing subsystem 112 does not receive the right eye image frame N 230. Rather, the parallel processing subsystem 112 reconstructs the right eye image frame N 230 using depth-image-based rendering (DIBR). With DIBR, a depth frame and an image frame from the viewpoint of one eye is reprojected to create an image frame from the viewpoint of the other eye. Because the right eye sees a slightly different portion of the scene than the left eye, some portions of the right eye image frame N 230 remain unwritten after the reprojection. These unwritten portions result in gaps or holes in the right eye image frame N 230, an artifact known as disocclusion. Disocclusion may appear as dark bands or lines in the right eye image frame N 230. As further described below, the disocclusion gaps are filled with plausible pixel data based on corresponding pixels from a prior image frame.

The right eye image frame N−1 240 is an array of pixels representing an image at time N−1 previously viewed by the right eye. The parallel processing subsystem 112 receives the right eye image frame N−1 240 at time N−1 and stores the right eye image frame N−1 240 in a memory buffer. The parallel processing subsystem 112 identifies those pixels that remain unwritten in the right eye image frame N 230 after DIBR reprojection. The parallel processing subsystem 112 fills the unwritten pixels in the right eye image frame N 230 with corresponding pixel values from the right eye image frame N−1 240. These corresponding pixels in the right eye image frame N−1 240 represent pixels actually seen by the right eye during the prior image frame. After filling the disocclusion gaps, the parallel processing subsystem 112 transmits the right eye image frame N 230 to the right channel of the display device 110.

The right eye image frame N+1 250 is an array of pixels representing an image at time N+1 to be viewed by the right eye. The parallel processing subsystem 112 receives the right eye image frame N 250 and transmits the right eye image frame N+1 250 to the right channel of the display device 110. The parallel processing subsystem 112 may also store the right eye image frame N+1 250 in a memory buffer.

The right eye depth frame N+1 260 is an array of depth values at time N+1 corresponding to the pixels of the right eye image frame N+1 250. Each depth value in the right eye depth frame N+1 260 represents the distance of the corresponding pixel in the right eye image frame N+1 250 from the screen surface of the display device 110.

The left eye image frame N+1 270 is an array of pixels representing an image at time N+1 to be viewed by the left eye. The parallel processing subsystem 112 does not receive the left eye image frame N+1 270. Rather, the parallel processing subsystem 112 reconstructs the left eye image frame N+1 270 using DIBR, as described above. The parallel processing subsystem 112 fills resulting disocclusion gaps using corresponding pixel information from the previously stored left eye image frame N 210.

The DIBR process continues in this fashion, where the parallel processing subsystem 112 receives image and depth frames for one eye, reprojects the image frame to the viewpoint of other eye, and fills resulting disocclusion gaps using actual pixel data from a prior image frame for the other eye. Over time, the parallel processing subsystem 112 transmits a series of images to the display device 110, whereby images received by the parallel processing subsystem 112 are interleaved with images reprojected by the parallel processing subsystem 112 on each of the left and right channel.

In one embodiment, image frames and depth frames may include multiple samples for each pixel location corresponding to the screen surface of the display device 110. In such a case, each sample may represent the contribution of a particular graphics primitive to the corresponding pixel location. Typically, each pixel location may include one sample for each graphics primitive that covers, or partially covers, the pixel location. Each sample may be associated with various parameters, including, without limitation, pixel color, depth value, transparency, and the amount of the pixel area covered by the sample. Reprojecting an image with multiple samples per pixel location may include reprojecting each sample to a corresponding pixel in the second image frame, and blending the reprojected samples to determine a final value for the corresponding pixel. The parallel processing subsystem 112 may then store the blended samples in a corresponding pixel location of the final image frame. In an embodiment, the depth information for each sample at a given pixel location may include a base value and an offset value. The base value may be the depth value associated with the sample at the given pixel location that is closest to the screen surface of the display device 110. The offset value may be the difference between the actual depth value of a sample and the base value.

Figure 3:
FIG. 3 illustrates images associated with depth-image-based rendering, according to one embodiment of the present invention.
Figure 3:
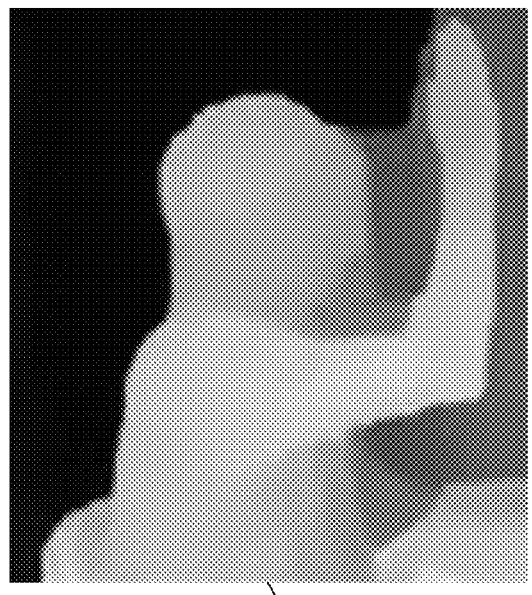
Figure 3:
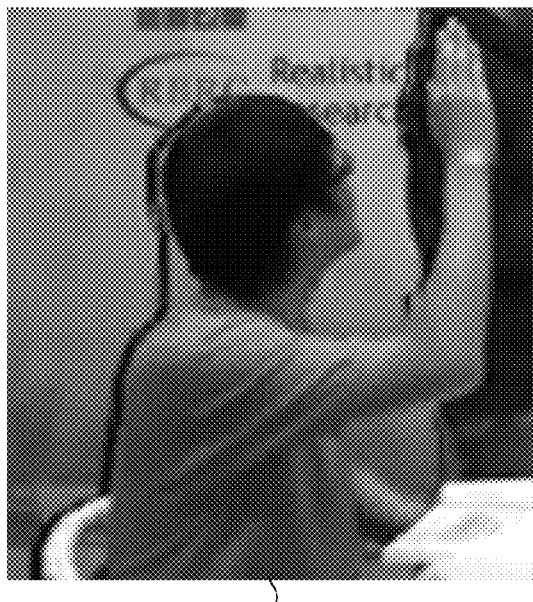
Figure 3:

FIG. 3 illustrates images associated with depth-image-based rendering, according to one embodiment of the present invention. As shown, the images include a left eye image frame 310, a left eye depth frame 320, a right eye image frame with disocclusion 330, and a right eye image frame after filling gaps 340.

The left eye image frame 310 illustrates a typical image frame received by the parallel processing subsystem 112. The parallel processing unit 112 transmits the left eye image frame 310 to the left channel of the display device 110. As described above, the parallel processing subsystem 112 may apply a filter, such as a blurring filter, to the left eye image frame 310 prior to transmitting the left eye image frame 310 to the display device 110.

The left eye depth frame 320 illustrates a typical depth frame received by the parallel processing subsystem 112, depicted as a grey-scale image. Lighter areas within the left eye depth frame 320 represent those portions of the left eye image frame 310 that are closer to the screen surface of the display device 110. Darker areas within the left eye depth frame 320 represent those portions of the left eye image frame 310 that are farther away from the screen surface of the display device 110.

The right eye image frame with disocclusion 330 illustrates a right eye image frame after reprojection and before filling the resulting disocclusion gaps. The disocclusion gaps appear as dark lines or bands in the right eye image frame with disocclusion 330. As described above, the disocclusion gaps result from portions of the right eye image frame that are visible to the right eye, but are not visible to the left eye as depicted in the left eye image frame 310.

The right eye image frame after filling gaps 340 illustrates the right eye image frame after filling the disocclusion gaps shown in the right eye image frame with disocclusion 330. As described above, the disocclusion gaps are filled using pixel information from a prior right eye image frame.

It will be appreciated that the architecture described herein is illustrative only and that variations and modifications are possible. In one example, the techniques described herein could be used in association with devices other than a geometry processing unit or geometry shader, including, without limitation, vertex shaders, tessellation shaders, and pixel shaders. In another example, reprojected images could have a different appearance than received images. Objects within a scene could change position from one frame to the next. Alternatively, the camera viewpoint could change position from one frame to the next. In such a case, filling disocclusion holes with image data from a prior frame could cause blurring or other artifacts in the image reprojected for the current frame. The received image, on the other hand, would not exhibit such a blurred appearance. In such cases, a filter, such as a blurring filter, could be applied to the received images to more closely match the reprojected images. Such a blurring filter could be applied as a function of the amount of motion of object or a camera motion from one image frame and an adjacent image frame.

Figure 4:
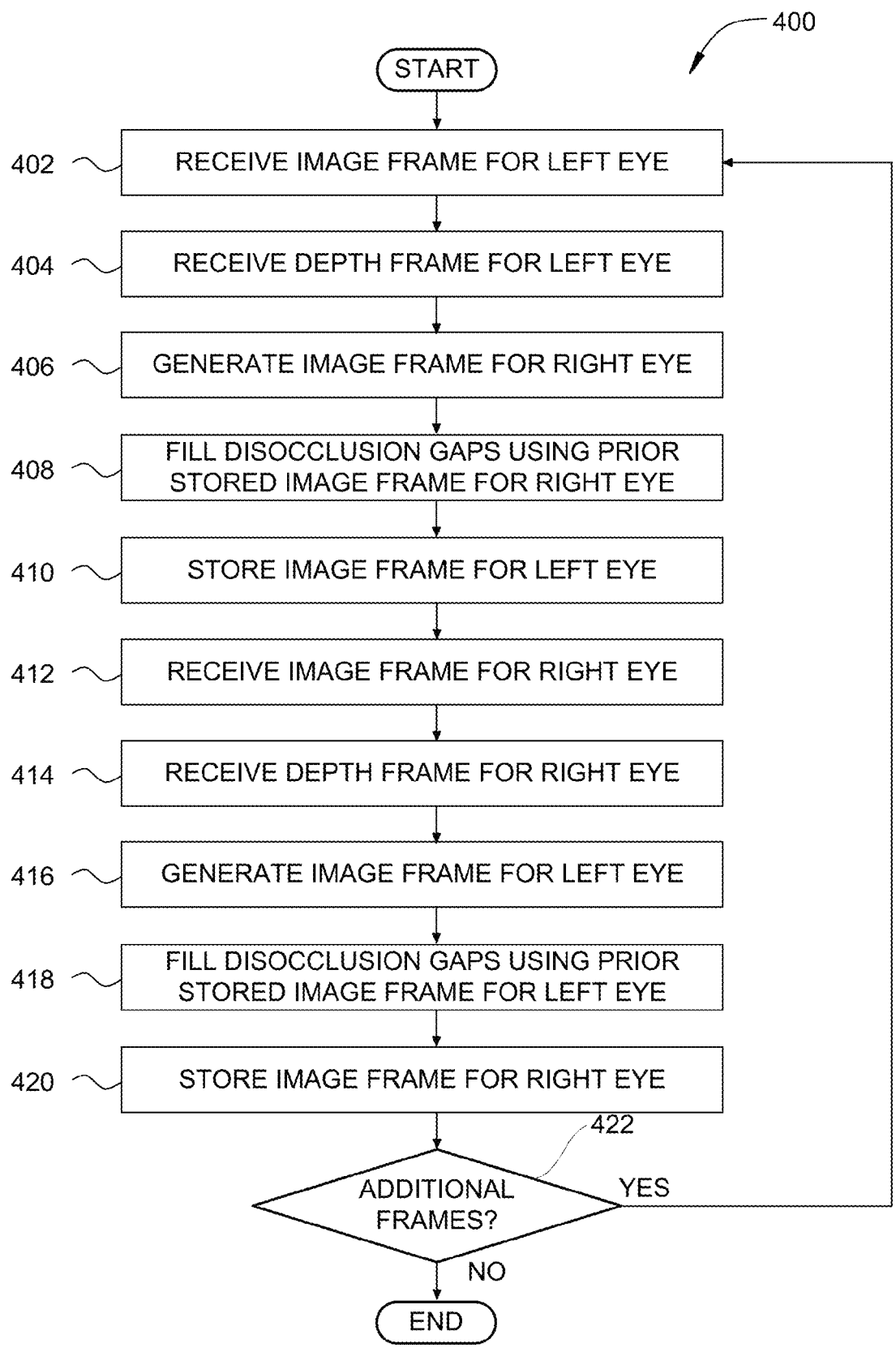
FIG. 4 sets forth a flow diagram of method steps for rendering stereoscopic images, according to one embodiment of the present invention.

FIG. 4 sets forth a flow diagram of method steps for rendering stereoscopic images, according to one embodiment of the present invention. Although the method steps are described in conjunction with the systems of FIG. 1, persons of ordinary skill in the art will understand that any properly configured computing system is within the scope of the present invention, where such a computing system may include a processing unit configured to perform the method steps described herein. Such processing units may include, without limitation, one or more central processing units (CPUs), one or more multi-core CPUs, one or more parallel processing units (PPUs), one or more graphics processing units (GPUs), one or more special purpose processing units, or the like. Further, although the method steps are described in conjunction with a processing unit, for example, a GPU that resides within the parallel processing subsystem 112, persons skilled in the art will understand that any subsystem or system configured to perform the method steps, in any order, is within the scope of the present invention.

The method 400 begins at step 402, where the processing unit receives an image frame corresponding to the left eye. At step 404, the processing unit receives a depth frame for the left eye, where the depth frame corresponds to the image frame received in step 402. At step 406, the processing unit generates an image frame for the right eye, based on the image frame and the depth frame for the left eye. The image frame for the right eye is generated using re-projection of the left eye image frame based on the depth information in the corresponding depth frame. Typically, this re-projection process results in disocclusion, because the right eye sees some portions of the scene that the left eye does not see. The pixels at these portions of the image frame for the right eye do not map to pixels in the image frame for the left eye, resulting in one or more holes or gaps in the image frame for the right eye. At step 408, the processing unit fills these disocclusion gaps using pixel information from a prior image frame for the right eye. This pixel information may be stored in a memory buffer. At step 410, the processing unit stores the left eye image frame received in step 402 in a memory buffer.

At step 412, the processing unit receives an image frame corresponding to the right eye. At step 414, the processing unit receives a depth frame for the right eye, where the depth frame corresponds to the image frame received in step 412. At step 416, the processing unit generates an image frame for the left eye, based on the image frame and the depth frame for the right eye. The image frame for the left eye is generated using re-projection of the right eye image frame based on the depth information in the corresponding depth frame. Typically, this re-projection process results in disocclusion, because the left eye sees some portions of the scene that the right eye does not see. The pixels at these portions of the image frame for the left eye do not map to pixels in the image frame for the right eye, resulting in one or more holes or gaps in the image frame for the left eye. At step 418, the processing unit fills these disocclusion gaps using pixel information from a prior image frame for the left eye. This pixel information may be stored in a memory buffer. For example, the pixel information may be from a prior image frame for the left eye may be retrieved from the storage buffer described above in conjunction with step 410. At step 420, the processing unit stores the right eye image frame received in step 412 in a memory buffer.

At step 422, the processing unit determines whether there are additional image frames to process. If there are additional image frames to process, then the method 400 proceeds to step 402, described above. If there are no additional image frames to process, then the method 400 terminates.

In sum, a processing unit generates stereoscopic images by receiving an image frame with an associated depth frame for a first eye and reprojecting the image frame to the perspective of the second eye. Holes or gaps in the reprojected image, caused by disocclusion, are filled by using pixel information from a prior image frame for the second eye, where the prior image frame is stored in memory buffer. The received image frame may be blurred to match the appearance of the reprojected image. Pixels may include multiple samples where each sample is reprojected separately. Samples corresponding to a given pixel are then reprojected separately and blended to form a final pixel value.

One advantage of the disclosed techniques is that DIBR reprojected image frames have a more realistic appearance where gaps are filled using pixels from a prior image for the same eye. Where objects near disoccluded areas are not moving, the left and right images generated with the disclosed techniques are equivalent to fully rendering images for both the left and right eye. Where objects near disoccluded areas are moving, gaps are filled with pixels representing the position of the moving objects from one image frame prior. The resulting images have generally superior image quality as compared to prior techniques, while maintaining the performance advantages of image-based rendering.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for generating stereoscopic images, the method comprising:
receiving a first image frame associated with a first eye;
receiving a first depth frame associated with the first eye;
reprojecting the first image frame based on the first depth frame to create a second image frame associated with a second eye;
identifying a first pixel in the second image frame that remains unwritten as a result of reprojecting the first image frame; and
determining a value for the first pixel based on a corresponding pixel in a prior image frame associated with the second eye, wherein the prior image frame is not reconstructed based on depth information.

2. The method of claim 1, wherein determining a value for the first pixel comprises:
retrieving the corresponding pixel from a memory buffer that includes the prior image frame; and
setting the value for the first pixel to the corresponding pixel in the prior image frame.

3. The method of claim 1, further comprising applying a filter to the first image frame based on an amount of motion associated with the first pixel.

4. The method of claim 3, wherein the filter comprises a blurring filter.

5. The method of claim 1, further comprising:
receiving a third image frame associated with the second eye;
receiving a second depth frame associated with the second eye;
reprojecting the third image frame based on the second depth frame to create a fourth image frame associated with the first eye;
identifying a second pixel in the fourth image frame that remains unwritten as a result of reprojecting the third mage frame; and
determining a value for the second pixel based on a corresponding pixel in the first image frame.

6. The method of claim 1, wherein reprojecting the first image frame comprises:
determining that a second pixel associated with the first image frame comprises a plurality of samples, wherein each sample of the plurality of samples includes image and depth information;
reprojecting each sample of the plurality of samples to a corresponding pixel in the second image frame;
blending the reprojected samples to determine a final value for the corresponding pixel; and
storing the corresponding pixel in the second image frame.

7. The method of claim 6, wherein the depth information for a first sample included in the plurality of samples comprises a depth value associated with a second sample included in the plurality of samples that is located closest to a screen surface of a display device and a depth offset comprising a distance between the first sample and the second sample.

8. A non-transitory computer-readable storage medium including instructions that, when executed by a processing unit, cause the processing unit to perform an operation for generating stereoscopic images, the operation comprising:
receiving a first image frame associated with a first eye;
receiving a first depth frame associated with the first eye;
reprojecting the first image frame based on the first depth frame to create a second image frame associated with a second eye;
identifying a first pixel in the second image frame that remains unwritten as a result of reprojecting the first image frame; and
determining a value for the first pixel based on a corresponding pixel in a prior image frame associated with the second eye, wherein the prior image frame is not reconstructed based on depth information.

9. The non-transitory computer-readable storage medium of claim 8, wherein determining a value for the first pixel comprises:
retrieving the corresponding pixel from a memory buffer that includes the prior image frame; and
setting the value for the first pixel to the corresponding pixel in the prior image frame.

10. The non-transitory computer-readable storage medium of claim 8, wherein the processing unit is further configured to perform the step of comprising applying a filter to the first image frame based on an amount of motion associated with the first pixel.

11. The non-transitory computer-readable storage medium of claim 10, wherein the filter comprises a blurring filter.

12. The non-transitory computer-readable storage medium of claim 8, wherein the processing unit is further configured to perform the steps of:
receiving a third image frame associated with the second eye;
receiving a second depth frame associated with the second eye;
reprojecting the third image frame based on the second depth frame to create a fourth image frame associated with the first eye;
identifying a second pixel in the fourth image frame that remains unwritten as a result of reprojecting the third mage frame; and
determining a value for the second pixel based on a corresponding pixel in the first image frame.

13. The non-transitory computer-readable storage medium of claim 8, wherein reprojecting the first image frame comprises:
determining that a second pixel associated with the first image frame comprises a plurality of samples, wherein each sample of the plurality of samples includes image and depth information;
reprojecting each sample of the plurality of samples to a corresponding pixel in the second image frame;
blending the reprojected samples to determine a final value for the corresponding pixel; and
storing the corresponding pixel in the second image frame.

14. The non-transitory computer-readable storage medium of claim 13, wherein the depth information for a first sample included in the plurality of samples comprises a depth value associated with a second sample included in the plurality of samples that is located closest to a screen surface of a display device and a depth offset comprising a distance between the first sample and the second sample.

15. The non-transitory computer-readable storage medium of claim 8, wherein the second image frame is reconstructed based on depth information.

16. The non-transitory computer-readable storage medium of claim 8, wherein image frames associated with the first eye and image frames associated with the second eye are received in an alternating manner.

17. A subsystem, comprising:
a processing unit; and
a memory containing instructions, that, when executed by the processing unit, cause the processing to generate stereoscopic images, by:
receiving a first image frame associated with a first eye;
receiving a first depth frame associated with the first eye;
reprojecting the first image frame based on the first depth frame to create a second image frame associated with a second eye;
identifying a first pixel in the second image frame that remains unwritten as a result of reprojecting the first image frame; and
determining a value for the first pixel based on a corresponding pixel in a prior image frame associated with the second eye, wherein the prior image frame is not reconstructed based on depth information.

18. The subsystem of claim 17, wherein determining a value for the first pixel comprises:

retrieving the corresponding pixel from a memory buffer that includes the prior image frame; and setting the value for the first pixel to the corresponding pixel in the prior image frame.

19. The subsystem of claim 17, wherein the processing unit is further configured to perform the step of applying a filter to the first image frame based on an amount of motion associated with the first pixel.

20. The subsystem of claim 19, wherein the filter comprises a blurring filter.

21. The subsystem of claim 17, wherein the processing unit is further configured to perform the steps of:

receiving a third image frame associated with the second eye;

receiving a second depth frame associated with the second eye;

reprojecting the third image frame based on the second depth frame to create a fourth image frame associated with the first eye;

identifying a second pixel in the fourth image frame that remains unwritten as a result of reprojecting the third mage frame; and determining a value for the second pixel based on a corresponding pixel in the first image frame.

22. The subsystem of claim 17, wherein reprojecting the first image frame comprises:

determining that a second pixel associated with the first image frame comprises a plurality of samples, wherein each sample of the plurality of samples includes image and depth information;

reprojecting each sample of the plurality of samples to a corresponding pixel in the second image frame;

blending the reprojected samples to determine a final value for the corresponding pixel; and storing the corresponding pixel in the second image frame.

* * * * *